Jan. 2, 1951      A. S. RITTER      2,536,139
AXIALLY SHIFTING TYPE FRAME SUSPENDED
TIRE REMOVING DEVICE

Filed Jan. 19, 1946      4 Sheets-Sheet 1

INVENTOR.
ALEX S. RITTER
BY George B. White
HIS ATTORNEY

INVENTOR.
ALEX S. RITTER
BY George B. White
HIS ATTORNEY

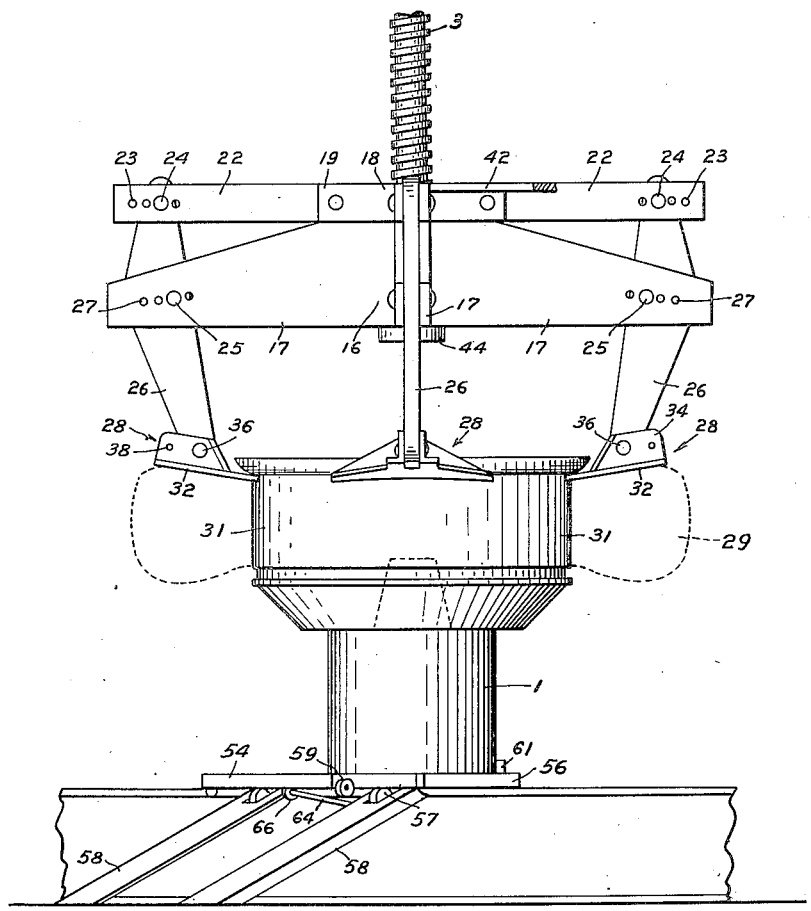
Fig. 5.
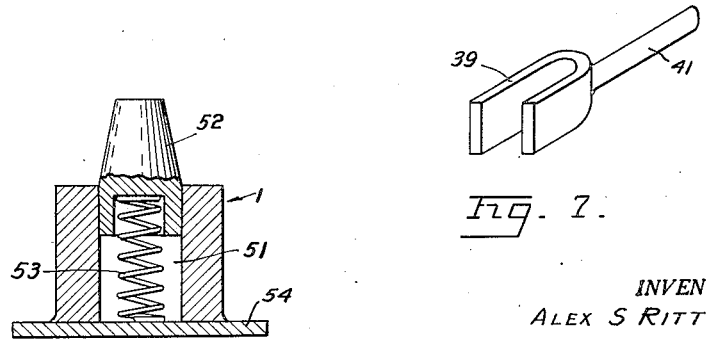
Fig. 6.
Fig. 7.
INVENTOR.
ALEX S RITTER
BY George B. White
HIS ATTORNEY Patented Jan. 2, 1951

2,536,139

UNITED STATES PATENT OFFICE 2,536,139

AXIALLY SHIFTING TYPE FRAME SUSPENDED TIRE REMOVING DEVICE

Alex S. Ritter, San Rafael, Calif.

Application January 19, 1946, Serial No. 642,323

12 Claims. (Cl. 157—1.2)

This invention relates to a tire removing device.

An object of the invention is to remove tires from heavy truck wheels, or tires where the tires are tight on the rim and are usually difficult to loosen.

Another object of the invention is to provide a tire removing device in which the tire is held on a rim in an aligned position to be pushed downwardly by self-adjustable removing elements which automatically operate to effectively strip and push the tire from the rim.

Another object of the invention is to provide a tire removing device in which the action of the tire pushing elements is such that relative pivotal adjustment occurs corresponding to the pressure and the resistance to the movement of said elements during the tire removing operation, so that the elements are guided or directed by the pressure upon the tire to assume a balanced position at the best angles for pushing the tire off the rim.

A further object of the invention is to provide a tire remover which has means for placing the tire into an automatically aligned position with respect to removing elements, and has means to control the movement of said removing elements with respect to the tire and to the rim, and which applies forces at the most effective angles for pushing the tire off the rim.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 5 is a detail view showing the remover elements in a position moved inwardly under the flange of the rim;

Fig. 6 is a fragmental sectional view of the tire rim support;

Fig. 7 is a perspective detail view of a wedge which is inserted for relative adjustment of said elements in various positions.

Figure 1:
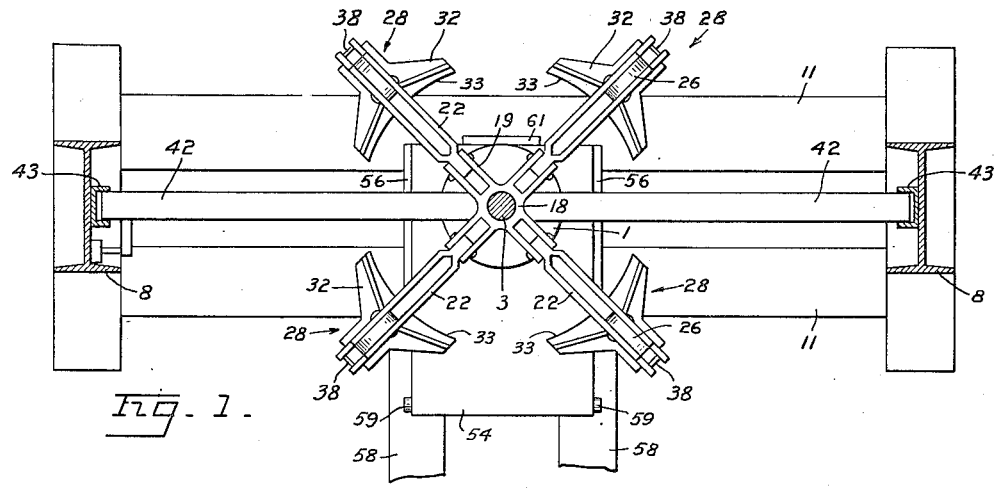
Fig. 1 is a sectional plan view of my tire remover device, the section being taken on the line 1—1 of Fig. 2.

On heavy wheels such as heavy truck wheels and in the removal of large tires, and in other cases where there is close adherence between a tire and a rim, a great deal of difficulty is encountered, when it is necessary to remove the tire from the rim. Very frequently it takes over an hour or more to loosen and remove such a tire from a wheel. In the average shop, a worker is usually able to remove only about five such tires a day. Certain mechanical devices that were provided in the past, endeavored to push the rim out of the tire or otherwise pry the tire loose, either damaged the parts of the wheel or the tire, or involved complicated time wasting manipulations. In the device of my invention, comparatively few simple operations are performed speedily. In experimental use of my device in shops, the number of tires removed was increased five to six times over previous comparative performance in the same shop.

In the illustrative embodiment of my invention I make use of a stand 1 which is held in an aligned position centered under a pushing mechanism 2 so that the axis of the stand 1 is aligned with the axis of the shaft 3 of the pushing mechanism 2. A suitable transmission 4 transmits power to the pushing mechanism from a drive shaft 6 which is driven by any suitable means such as by an electric motor 7. The device is mounted on a suitable frame. In the present illustration a pair of vertical frame members 8 are formed by I beams connected by a top beam 9 and by bottom beams 11. The frame formed by these beams supports the respective elements of my device. The casing of the transmission mechanism 4 is mounted on the top beam 9. A hub 12 extended downwardly from the transmission casing aligns the shaft 3. The upper end 13 of the shaft 3 projects above the frame 9 so as to provide for the play necessary in the lifting and lowering of the pushing device 2. The gearing mechanism, not shown, in the transmission 4 is adapted to engage the shaft 3 which latter is provided with teeth in the nature of a rack, so that as the transmission operates it will move the shaft 3 up or down. On the lower end of the shaft 3 is provided a hub 16 free to slide axially on the shaft. A plurality, in this instance four, forked arms 17 extend laterally and at right angles to one another from said hub 16. Normally spaced above the hub 16 is another hub 18 having a plurality, in this instance four, forked radial bearings 19 extending in alignment with the forked arms 17. In each of the forked bearings 19 is pivoted around a substantially horizontal pivot, a yoke 22. Said yokes 22 extend radially. In the outer ends of the legs of each yoke 22 are a series of holes 23 to accommodate a pivot pin 24. Pressure arms 26 extend in the yokes 22 and also between the respective lower forked arms 17. The upper ends of the pressure elements 26 are pivoted on their respective pivot pins 24 in the selected holes 23. Through the lower forked arms 17 extend a series, in this case four, aligned holes 27 to accommodate another pivot pin 25 for pivoting the respective pressure arms 26 at points spaced from the upper ends thereof.

Figure 3:
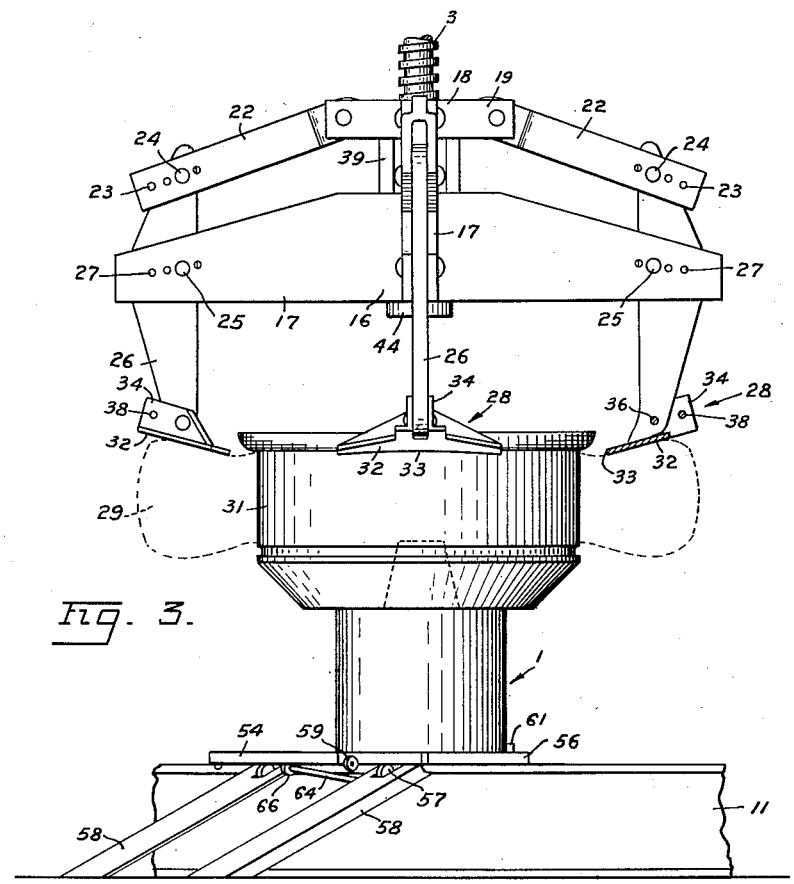
Fig. 3 is a detail view of the tire removing elements in an initial position.

On the lower edge of each pressure arm 26 is a pushing shoe 28 for transmitting pressure to the tire 29 as indicated in broken lines in Figs. 3 and 5.

The tire 29 is on a rim 31 which rim rests on the stand 1 as shown in Figs. 3 and 5. Each pressure shoe 28 is formed by a base plate 32 which has an arcuate edge 33 facing toward the center of the device. From each plate 32 extends upwardly a yoke 34 which straddles the lower end of the adjacent arm 26 and is swingably pivoted by a pivot pin 36 which extends through the flanges of the yoke 34 and through the lower end of the arm 26. The upward swinging of each shoe 28 is limited by a lug or projection extended inwardly from the yoke 34 and abutting against the inner corner of the arm 26. The downward swinging of the wedge or edge 33 of each shoe 28 is limited by a stop abutment 38 between the flanges of the yoke 34 abutting against the outer edge of the arm 26. Thus when pressure is exerted on the bottom of the plate 32 the upward swing will be limited by reason of the abutment of the lug or projection against the inner edge of the arm 26. When the shoes 28 hang loosely upon the arms 26, or a force is exerted tending to turn the inner edge downwardly, this movement is limited by the aforesaid abutment 38 against the outer edge of the arm 26.

Figure 2:
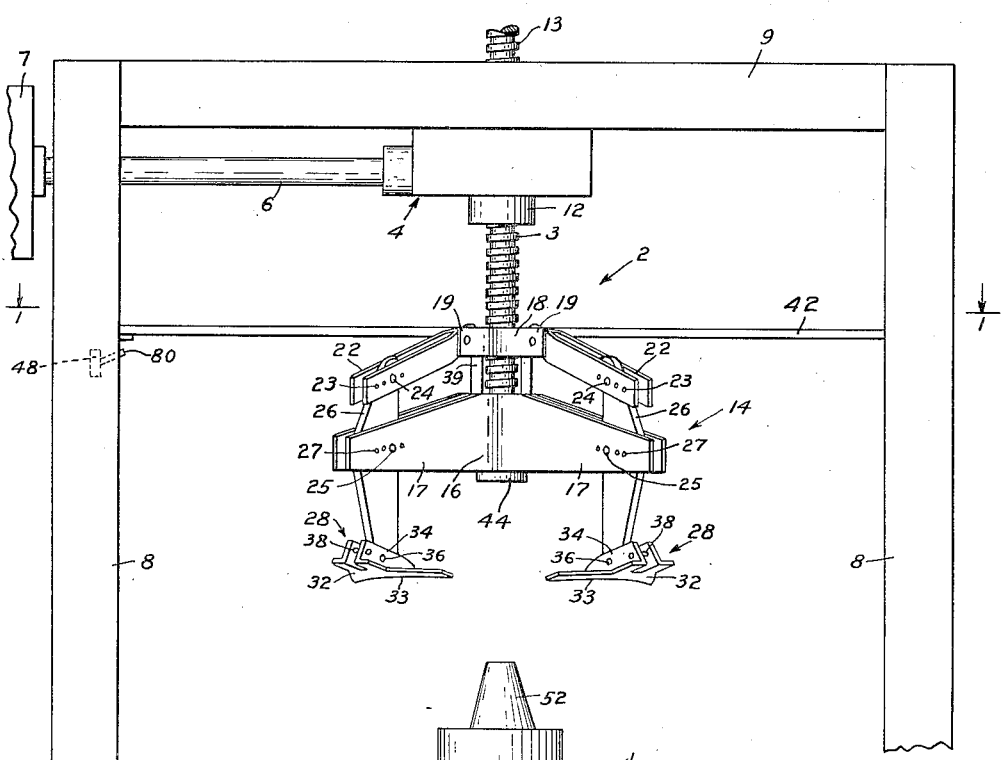
Fig. 2 is a front view of my tire remover device.

After the tire is centered on the stand 1, the unit in the center is lowered toward the tire casing 29. During this initial movement a wedge 39 is placed between the lower hub 16 and the upper hub 18 so as to prevent relative movement of the arms 26. When the arms 26 are placed in the proper holes 23 and 27 respectively, for the respectively correct wheel diameters, then the shoes in this initial lowering position will clear the outer periphery of the flange bead of the rim 31 and will commence the pressure upon the tire casing 21 in the manner shown in Fig. 3. At this point of operation the wedge 39 is removed. It is to be noted that the manipulation of the wedge 39 is facilitated by a handle 41 on said wedge. When the wedge 39 is pulled out from between the hubs 16 and 18, the further lowering of the unit 2 will exert an inward force upon the shoes 28 and will turn the lower ends of the arms 26 inwardly toward the center of the unit 2. This pivotal movement of the arms around the fulcrums 25 moves the upper fulcrums outwardly so as to straighten out the position of the radial yokes 22 in the manner shown in Fig. 5. This relative movement between the yokes 22 and the lower portion of the unit 2, moves the shoes inwardly so that the edges 33 of the base plates 32 of the shoes 28 move substantially into contact with the outer periphery of the rim 31 as shown in Fig. 5. Further downward movement of the unit 2 will move the shoes 28 downwardly and against the casing 29 exerting a downward shearing force at the bead of the casing 29 and toward the outer periphery of the rim 31 so as to positively push the bead of the tire off the rim 31. After the carcass or casing 29 is pushed off the rim 31 the gravity of the shoes 28 allows their outward swinging and by reason of the balance of the arms 26 and the shoes 28 the yokes 22 are again turned back to the position shown in Fig. 2 and the hubs 16 and 18 are separated so that the wedge 39 may be inserted therebetween. In this position the shoes 28 are again spread outwardly so they can clear the flange of the rim 31 during their upward stroke. The operation of the transmission 4 is then reversed and the unit is pulled upward away from the stand 1, permitting the removal of the rim 31 and the clearing of the machine for the next operation. The upward and downward movement of the unit 2 is guided by horizontal guide bars 42 which extend from the upper hub 18 and have their outer ends in slidable engagement with vertical channels 43 on the frame members 8 as particularly shown in Figs. 1 and 2. This prevents the turning of the unit 2.

The series of holes 24 and 27 are so spaced that the respective positions of the shoes 28 when the arms 26 are pivoted in the respective holes of the series, would correspond to the diameters, respectively, of 18, 20, 22 and 24 inch wheels and the fulcruming of the arms 26 is such that the shoes 28 extend to the sides of the rim 31 but are not jammed against said rim 31.

The harder pressure is exerted upon the tire 29 by the shoes 28, the sharper will be the stripping action. In other words, the resistance of the tire 29 depends upon the sticking of the inner periphery or bead of the tire 29 to the rim 31, the force exerted by the shoes 28 is dependent upon the resistance offered by the tire 29, the upward component of forces moves the shoes 28 inwardly toward the rim and increases the scraping or stripping action according to the resistance offered by the tire 29. It also moves stripping edges 33 of the shoes 28 to under the bead flange of the rim 31. This relative movement is achieved because the lower hub 16 is pushed up toward the upper hub 18. When the wedge 39 is removed, then the lower hub 16 is moved up against the upper hub 18 by the resistance against the shoes 28 and by this movement the aforesaid pivotal action of the arms 26 is accomplished, namely, the lower ends of the arms are moved inwardly and toward the rim 31 and the upper ends of the arms 26 are moved outwardly, and swing the yokes 22 toward the horizontal position. When the resistance to the movement of the unit 2 ceases, for instance, when the tire 29 is loosened from the rim 31, the gravity of the shoes 28 shifts the hub 16 of the lower unit downwardly and into the said initial spaced position. In order to prevent damage to the lower end of the shaft 3 during this return movement of the hub 16, the lower end of the mounting 14 of the shaft 3 is provided with a suitable buffer 44 which absorbs the shock of the lowering of the hub 16.

Figure 8:
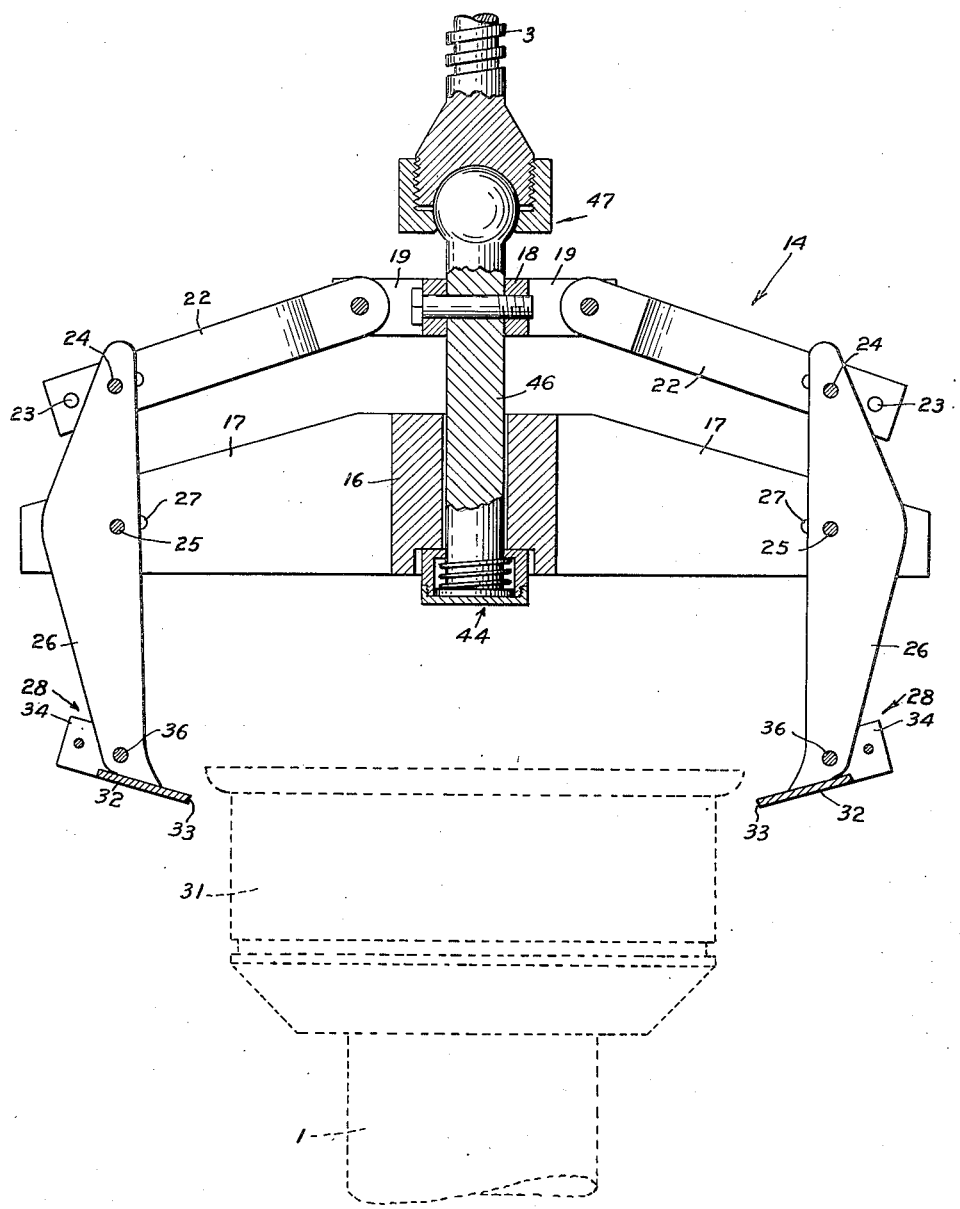
Fig. 8 is a partly sectional view of the tire removing mechanism with a modified self-centering mounting.

In order to provide for an equalization of the push on all sides according to the different pressures on the various shoes 28, and to accomplish balanced and uniform action by all the shoes 28, the lower portion of the shaft 3 may be made separate and swingable by said mounting 14, as shown in Fig. 8. Said mounting 14 includes a short shaft 46 secured to the shaft 3 by a ball and socket joint 47 which allows the tilting of the shaft 46 in any direction according to the variation of pressure exerted on the different shoes 28. The lower hub 16 slides on this short shaft 46 and the buffer 44 is on the lower end of the short shaft 46. Thus the pressure on the tire 29 is applied in accordance with the position of the tire portions which stick to the rim 31.

The apparatus herein described is driven by the electric motor 7 and is controlled by an electric switch 48. By turning "on" the switch 48 the motor 7 is operated and through the drive shaft it turns the transmission 4 so as to lower the shaft 3 and the unit 2. When the tire 29 is pushed off the rim 31 the operator turns the switch 48 in the reverse direction so as to reverse the direction of the motor 7 and of the shaft 6 and the transmission 4 in the opposite direction, moving the shaft 3 and the unit 2 upwardly. For the automatic limitation of the upward stroke of the unit 2 an abutment on the guide bar 42 operates to tip and open the switch 48 to neutral open position 80 as to stop the operation of the motor 7 before the unit 2 abuts against the transmission 4 on the top structure of the frame.

The stand 1 in the present illustration is hollow and in the hollow passage 51 in the center of the stand 1 is slidably supported a centering arbor 52 which is slidable in the central passage 51 of the stand 1 and is held in an upwardly extended position by a coil spring 53 within said passage 51. This device automatically centers wheels of any size. The wheels are dropped upon the arbor 52 and are held in a horizontal position and depress the arbor 52 against the action of the spring 53 so that the wheel ultimately rests upon the stand 1.

Figure 4:
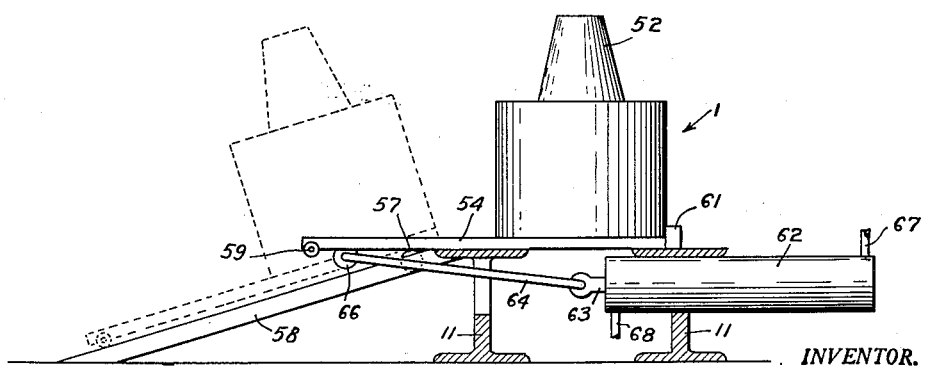
Fig. 4 is a detail view of the mechanism for placing and removing the rim and the tire in said device.

In order to facilitate the placing of the wheels on the stand 1. the stand 1 is placed on a platform 54. This platform 54 is slidable between guides 56 on the top of the frame base 11. The platform 54 extends forwardly from the base 11 and the forward projection thereof rests on transverse supporting rollers 57. A pair of tracks 58 extend forward from the frame base 11 and at a downward incline as shown in Fig. 4. The roller 57 is supported in a slot of each of the tracks 58 at a point substantially in level with the top of the frame base 11 and with the bottom surface of the platform 54 when said platform 54 is in the horizontal position. When the platform 54 is pulled out, it tilts downwardly. Bearing rollers 59 at the corners of the outer edge of the platform 54 lie upon the tracks 58 when the platform 54 is tilted as shown in broken lines in Fig. 4. The other portions of the platform 54 roll upon the roller 57. In this manner easy rolling movement of the platform 54 and the stand 1 is accomplished. The tire wheel is placed upon the stand 1 while it is in the tilted position shown in Fig. 4 in broken lines and then the platform 54 is pushed upwardly and back into the horizontal position shown in full lines. An abutment 61 on the base 11 is located in such position that the platform 54 in its upward movement abuts against said abutment 61 in a position wherein the stand 1 is centered under the axis of the shaft 3. In this manner the automatic centering of the tire wheels in the device is accomplished.

The shifting of the platform 54 and the stand 1 can be accomplished by power control as shown in the present illustration. A hydraulic or pneumatic cylinder 62 is mounted on the base 11. A usual plunger, not shown, works in the cylinder 62. A connecting rod 63 of the plunger is connected by a link 64 to a pivotal connection 66 on the underside of the forward edge of said platform 54. The usual conduits 67 and 68 at the opposite ends of the cylinder 62 work as exhaust or intake during the reciprocation of the cylinder 62 in the usual manner, and the control of the pressure medium through said conduits 67 and 68 is accomplished by suitable manipulable control mechanism, not herein shown. This control mechanism may be operated manually or by a pedal. When the pneumatic medium is admitted at the conduit 67 it will push the plunger and the connecting rod 63 forwardly and the force thus transmitted by the links 64 pushes the platform 54 off the top of the base 11 until the platform tilts and drops into the broken line position shown in Fig. 4. Then the tire wheel is removed or replaced upon the stand 1, as the case may be, and the controls are operated to admit the pressure medium through the other conduit 68 using the first conduit 67 as an exhaust and the mechanism works in the opposite direction pulling the mechanism back into its upright position as shown in Fig. 4.

I claim:

1. In a tire removing device of the character described, a stand for supporting the rim of a tire, a frame, a tire pushing mechanism supported on the frame in alignment with said stand, said tire pushing mechanism including a vertically movable suspending element slidably held on the frame, a plurality of radially extended arms, an element on said suspending element pivotally supporting said arm, a vertical lever arm pivotally connected to each of said first arms and extending downwardly, fulcrum means supported slidably on said suspending element below said first arms for fulcruming said lever arms between the ends of the lever, a pivoted shoe on the lower end of each lever arm for engagement with the tire on said rim, the said fulcrum means being adapted to be initially spaced from said arm supporting element, and means to raise and lower said suspending element and said pushing mechanism.

2. In a tire removing device of the character described, a frame, a tire pushing mechanism on the frame including a substantially vertically movable suspending element slidably held on the frame, a plurality of substantially vertical lever arms, pivot means on said suspending element pivotally engaging said arms adjacent the upper ends thereof, fulcrum means slidably supported on said suspending element and below said pivot means and being pivotally connected to each of said arms at a point spaced from the lower end of each arm, a pivoted shoe on the lower end of each arm for engagement with a tire casing, a stand to support a rim with a tire thereon in axial alignment with said suspending element, the relative pivots on each arm being spaced for the turning of the lower end of each arm toward the center of the mechanism when the shoe thereon is pressed against said tire, and means to raise and lower said suspending element and said pushing mechanism.

3. In a tire removing device of the character described, a frame, a tire pushing mechanism on the frame including a substantially vertically movable suspending element slidably held on the frame, a plurality of substantially vertical lever arms, pivot means on said suspending element pivotally engaging said arms adjacent the upper ends thereof, fulcrum means slidably supported on said suspending element and below said pivot means and being pivotally connected to each of said arms at a point spaced from the lower end of each arm, a pivoted shoe on the lower end of each arm for engagement with a tire casing, a stand to support a rim with a tire thereon in axial alignment with said suspending element, the relative pivots on each arm being spaced for the turning of the lower end of each arm toward the center of the mechanism when the shoe thereon is pressed against said tire, and means to raise and lower said suspending element and said pushing mechanim, said pivot means and said fulcrum means each having a series of journals, respectively, for each pivot and fulcrum of each arm, said journals of each series being radially spaced for selective engagement with the pivots and fulcrums of each arm for selected diametrical distances of the shoes on said arms.

4. In a tire removing device of the character described, a vertically moving tire pushing mechanism, a stand for supporting a tire on a rim in alignment with the pushing mechanism, a plurality of generally vertical fulcrumed members on said pushing mechanism fulcrumed for movement of the lower ends thereof toward the center of said pushing mechanism, a shoe on the lower end of each fulcrumed member, each shoe having a base plate with an arcuate edge facing toward the center of the pushing mechanism, means to pivot each shoe on the lower end of the fulcrumed member, and abutment means between the lower end of the fulcrumed member and each shoe thereon to limit the upward and downward swinging of the shoe, the upward limiting abutment means exerting a force directed toward the rim of the tire when the shoe is pressing on the tire.

5. In a tire removing device of the character described, a frame, a pushing mechanism vertically movable on said frame, a stand for supporting the rim of a tire in alignment with the pushing mechanism, said pushing mechanism including a plurality of substantially vertical pressure arms, a swingable supporting element pivoted to about the upper end of each arm and held on said pushing mechanism, fulcrum means axially slidable on said pushing mechanism and being below said swingable supporting elements, and fulcruming the respective arms at points spaced between the ends of the respective arms, a pivotal shoe on the lower end of each arm extending generally toward the center of said pushing mechanism and being spaced from the center to normally clear the flange of said rim and engage the upper side of the tire upon said rim, the swinging of said swingable supporting elements relatively to said fulcrum means determining the inward movement of the shoes and of the lower ends of the respective arms when the shoes are pressed against the tire for pushing the tire off the rim, and means to move said pushing mechanism into and out of operative position.

6. In a tire removing device of the character described, a frame, a tire pushing mechanism vertically movable on the frame, a stand for supporting the rim and a tire on the rim in alignment with said pushing mechanism, said pushing mechanism including a vertical central element, a plurality of pressure arms equally spaced from said vertical element, swingable arms extended between the upper ends of said pressure arms and said vertical element and being pivoted to the upper ends of said pressure arms and being swingably connected to said vertical element, a fulcrum member slidable on said vertical element below said swingable arms and being pivotally connected to each of said pressure arms at a point spaced between the ends of the respective pressure arms to fulcrum said arms for inward and outward movement at the lower ends thereof as determined by the relative sliding of the said fulcrum member and the swinging of the said swingable pivot arms, a shoe pivoted on the lower end of each pressure arm and extending generally toward the axis of said vertical element, said shoes being spaced from the axis of said vertical element to a radial distance to clear the flange of said rim and bear upon the tire on said rim for pushing the tire off said rim, the angle of said shoes and said pressure arms being such as to urge said shoes and the lower ends of the said pressure arms toward the axis of said vertical element when pressed upon said tire, and means to move said vertical element, the portion of said vertical element on which said swingable arms and said fulcrum members are supported being universally adjustable with respect to the other portion of said vertical element.

7. In a tire removing device of the character described, a frame, a tire pushing mechanism supported on the frame and being vertically movable, a stand for supporting a rim and a tire thereon in alignment with said pushing mechanism, said tire pushing mechanism including a vertically reciprocable supporting element, a universally swivelable extension on the lower end of said element, a plurality of arms radially extended and pivotally supported on said extension, a pressure arm pivotally suspended from each of said pivot arms, a fulcrum member slidable on said extension below said pivot arms and fulcruming said pressure arms at points spaced respectively below the pivot ends of the respective pressure arms, a pivoted shoe on the lower end of each pressure arm extended toward the axis of the pushing mechanism and spaced to clear the flange of said rim for engagement with the top of the tire on said rim, said shoe being pivoted for upward and downward swinging for adjustment of position according to the pressure exerted on the tire both around the pivots of the respective shoes and around the fulcrum of the swivel extension for equalizing the pressure exerted on said tire, and means to move said pushing mechanism vertically on said frame.

8. In a tire removing device of the character described, a frame, a tire pushing mechanism supported on the frame and being vertically movable, a stand for supporting a rim and a tire thereon in alignment with said pushing mechanism, said tire pushing mechanism including a vertically reciprocable supporting element, a universally swivelable extension on the lower end of said element, a plurality of arms radially extended and pivotally supported on said extension, a pressure arm pivotally suspended from each of said pivot arms, a fulcrum member slidable on said extension below said pivot arms and fulcruming said pressure arms at points spaced respectively below the pivot ends of the respective pressure arms, a pivoted shoe on the lower end of each pressure arm extended toward the axis of the pushing mechanism and spaced to clear the flange of said rim for engagement with the top of the tire on said rim, said shoe being pivoted for upward and downward swinging for adjustment of position according to the pressure exerted on the tire both around the pivots of the respective shoes and around the fulcrum of the swivel extension for equalizing the pressure exerted on said tire, and means to move said pushing mechanism vertically on said frame, the fulcrum and the pivot on each arm being relatively positioned for directing the lower ends of said arms inwardly in accordance with the pressure exerted on the respective shoes and within the limits of the upward sliding of said fulcrum means and upward swinging of said pivot arms, the pivot of said pressure arms in said pivotal arms and the position of the fulcrums in said fulcrum means being adjustable to various limits of movement selectively for rims of various diameters.

9. In a tire removing device of the character described, a frame, a tire pushing mechanism supported on the frame and being vertically movable, a stand for supporting a rim and a tire thereon in alignment with said pushing mechanism, said tire pushing mechanism including a vertically reciprocable supporting element, a universally swivelable extension on the lower end of said element, a plurality of arms radially extended and pivotally supported on said extension, a pressure arm pivotally suspended from each of said pivot arms, a fulcrum member slidable on said extension below said pivot arms and fulcruming said pressure arms at points spaced respectively below the pivot ends of the respective pressure arms, a pivoted shoe on the lower end of each pressure arm extended toward the axis of the pushing mechanism and spaced to clear the flange of said rim for engagement with the top of the tire on said rim, said shoe being pivoted for upward and downward swinging for adjustment of position according to the pressure exerted on the tire both around the pivots of the respective shoes and around the fulcrum of the swivel extension for equalizing the pressure exerted on said tire, and means to move said pushing mechanism vertically on said frame, the fulcrum and the pivot on each arm being relatively positioned for directing the lower ends of said arms inwardly in accordance with the pressure exerted on the respective shoes and within the limits of the upward sliding of said fulcrum means and upward swinging of said pivot arms, abutment means between the lower end of each arm and the shoe thereon to limit the upward and downward swinging of said shoe around its pivot.

10. In a tire removing device of the character described, a frame, a tire pushing mechanism supported on the frame for vertical movement, a stand below said pushing mechanism for supporting a rim and a tire thereon in alignment with said pushing mechanism, said pushing mechanism including a plurality of shoes spaced to engage the side of the tire outside the flange of said rim, a plurality of fulcrumed arms supporting said shoes, and mounting means for supporting said arms, said mounting means being swivelable universally with respect to the axis of said pushing mechanism for equalizing the action of said arms of said shoes.

11. In a tire removing device of the character described, a frame, a tire pushing mechanism vertically movable on the frame, a stand for supporting the tire on a rim in alignment with the pushing mechanism, said tire pushing mechanism including a plurality of pressure shoes, each pressure shoe having a base plate extended substantially toward the center of the pushing mechanism, said shoes being spaced from said center for engaging the sides of the tire outside of said rim, a connecting device to support the shoes on said pushing mechanism being adapted to permit the swiveling of the shoes toward the rim according to the pressure engagement of the shoes with the sides of said tire and to swing said shoes outwardly into rim clearing position when not under pressure, said connecting device including lever arms, pivotal connection for a shoe on each lever arm, fulcrum means for said arms, a link fulcrum slidable with respect to the pushing mechanism, and links connected to the respective arms and to said link fulcrum to swing said arms around their respective fulcrums.

12. In a device for pushing a tire off a rim, a stand for holding the rim in alignment with said pushing mechanism, a slide support for said stand, means to guide said slide support into a tilted position when said slide and stand are moved out from under said pushing mechanism, and to hold said stand in a tilted position, and means to locate said slide and stand in central aligned position under said pushing mechanism when returned thereunder.

ALEX S. RITTER.

REFERENCES CITED

The following references are of record in the file of this patent:

UNITED STATES PATENTS

| Number | Name | Date |
|---|---|---|
| 924,514 | Warehock | June 8, 1909 |
| 1,259,036 | Mitchell | Mar. 12, 1918 |
| 1,564,496 | Staugaard | Dec. 8, 1925 |
| 1,724,813 | Weaver et al. | Aug. 12, 1929 |
| 1,890,746 | O'Dell | Dec. 13, 1932 |
| 2,024,891 | Apuler et al. | Dec. 17, 1935 |
| 2,065,833 | Stratton et al. | Dec. 29, 1936 |
| 2,233,371 | Smith | Feb. 15, 1941 |
| 2,282,608 | Rempel | May 12, 1942 |
| 2,375,956 | Smith et al. | May 15, 1945 |
| 2,406,996 | Colley | Sept. 3, 1946 |
| 2,416,195 | Mitchell | Feb. 18, 1947 |
| 2,446,963 | Stolz | Aug. 10, 1948 |

FOREIGN PATENTS

| Number | Country | Date |
|---|---|---|
| 248,107 | Great Britain | Mar. 4, 1926 |
| 659,107 | Germany | Apr. 25, 1938 |